R. V. COLLINS.

MOISTURE PROOF PACKING.

APPLICATION FILED NOV. 4, 1910.

Reissued Apr. 30, 1912. 13,409.

Witnesses:
Geo. Schmertz
H. Wächter

Inventor
Roy V. Collins
By his Attorneys
Kiddle & Prendell

UNITED STATES PATENT OFFICE.

ROY V. COLLINS, OF NEW YORK, N. Y., ASSIGNOR TO AMERICAN AUTOMATIC SWITCH COMPANY, OF NEW YORK, N. Y., A CORPORATION OF NEW YORK.

MOISTURE-PROOF PACKING.

13,409. Specification of Reissued Letters Patent. Reissued Apr. 30, 1912.

Original No. 908,647, dated January 5, 1909, Serial No. 414,856. Application for reissue filed November 4, 1910. Serial No. 590,767.

*To all whom it may concern:*

Be it known that I, ROY V. COLLINS, a citizen of the United States, and a resident of the borough of Manhattan of the city of New York, in the county and State of New York, have invented certain new and useful Improvements in Moisture-Proof Packing, of which the following is a specification, reference being had to the accompanying drawings, forming a part hereof.

Where mechanism such as is employed in the electrical operation of railway switches, is located in the ground adjacent to a switch, it is necessary to incase it carefully in a moisture proof box or housing-means having an inclosed chamber so that it shall not become deranged through the infiltration of water or the penetration of dirt. As a general rule, such boxes are provided with a plunger which extends through one of the sides or ends thereof for the purpose of transmitting to the switch the power or motion developed within the box. In such an arrangement it is particularly difficult to so pack the plunger as to effectively keep out the moisture and dirt without at the same time interfering with the proper movements of the switch mechanism; and in any event such packing is difficult to keep tight and in a uniform condition about the plunger, with the result that it can hardly be said to afford such substantial protection to the mechanism inside the box as is desired.

In accordance with the present invention, the motion or power is transmitted from the moisture proof box inclosing the mechanism to be protected, through the medium of a shaft which projects from said box; and a novel form of packing has been devised for the projecting end of the shaft to provide a perfectly water tight and dust proof seal.

Figure 1:
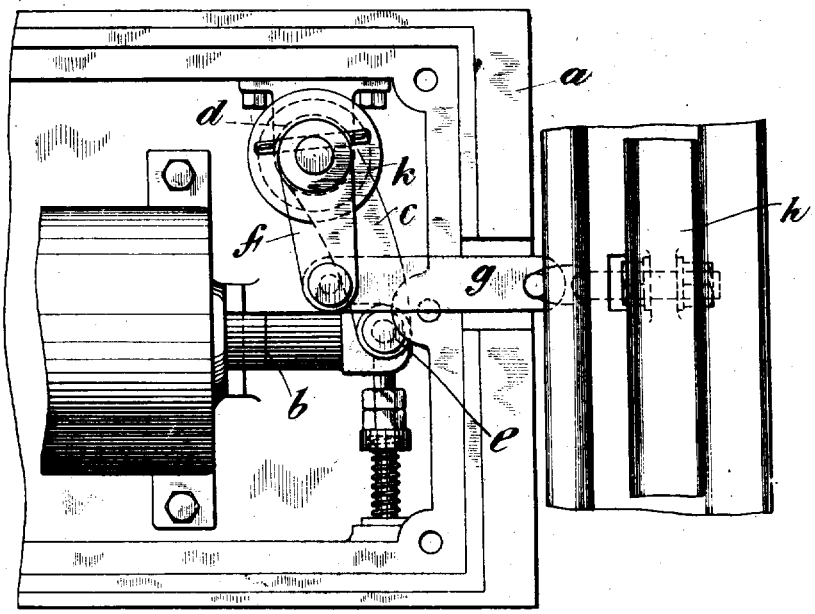
Figure 2:
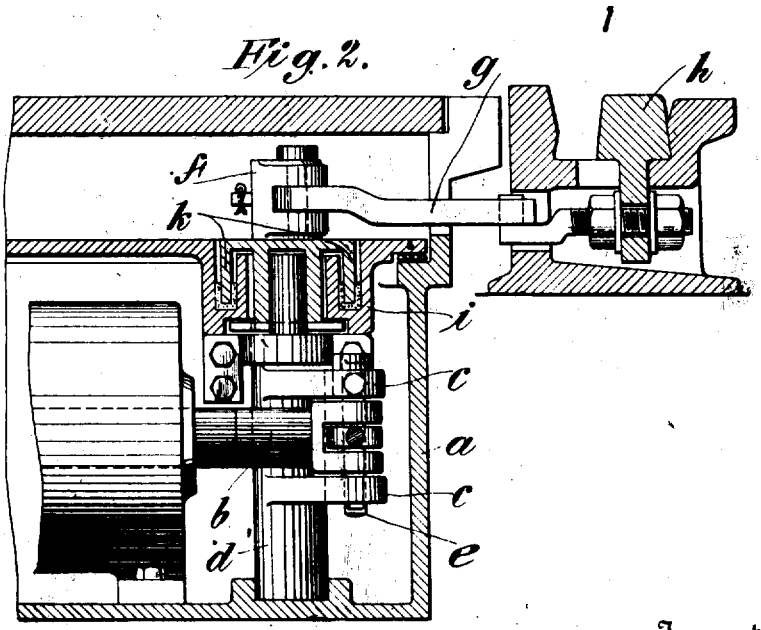

The improvements will be more fully described with reference to the accompanying drawings in which, Figure 1 is a plan view of a sufficient portion of the box, with the improvements embodied therein, to enable the invention to be understood, the cover of the box being removed, and, Fig. 2 is a view partly in elevation and partly in vertical section.

The construction of the box itself is immaterial to the present invention; as illustrated in the drawing, only one end of the box is shown, being indicated by the letter *a*, while the other end is broken off. At this end, a plunger, which in the present case forms a part of the core of an electromagnet and which as will be understood is reciprocated by the magnet, is indicated by the letter *b*. It is operatively connected, through arms *c* above and below, with a shaft *d*, journaled at one end in the bottom of the box and with the other end projecting through an inner cover or horizontal partition of the box which protects the switch mechanism. The arms *c* are pivoted to the plunger, a pin *e* extending through the free ends of said arms and the plunger for this purpose, and the other ends of said arms are made fast to the shaft *d*, so that as the plunger is reciprocated the shaft will be turned first in one direction and then in the other direction. The projecting end of the shaft is provided with an arm *f* the end of which is secured through a link *g* to the switch indicated at *h*. This arm and link are, for convenience and simplicity in the installation of the switch, provided in a space between the inner cover and an outer cover to the box.

In the cover of the box around the projecting end of the shaft is formed a circular cup *i* and the shaft is provided with an annular flange *k* which extends downwardly into the cup (Fig. 2.) It will be noted that the circular cup *i* depends below the partition and that such construction allows a liquid seal to be utilized within the box without materially increasing the height of the box or crowding any of the working elements of the switch throwing device. When the switch mechanism is placed in operative position adjacent to a switch, the cup is filled half way up or more with quicksilver so that the lower end of the annular flange upon the shaft is immersed therein. In this way it will be obvious that a perfectly water-tight and dust-proof seal is formed which leaves the shaft absolutely free to transmit power to the switch. It will be understood of course that the cup may be secured to the shaft and the projecting flange may be formed as as part of the box without departing from the invention and it will be obvious that other changes may be made in the construction shown and described without avoiding the spirit of the invention.

I claim as my invention:

1. The combination with an electric switch mechanism, of a box inclosing said mechanism and having an inner and an outer cover, a shaft in operative relation with said mechanism and journaled in said box, said shaft having one end projecting through the inner cover into the space between the two covers, a cup formed in the inner cover around the projecting end of the shaft, an annular flange extending into the cup and secured to the shaft, and a connecting arm in said space secured to the projecting end of the shaft.

2. An apparatus of the class described comprising a housing, a switch throwing device adapted to be connected to a switch, operating means connected to and adapted to operate said switch throwing device and inclosed in said housing, a horizontal partition separating said switch throwing device and operating means, and a seal interposed between said switch throwing device and said operating means embodying a cup depending from said partition and containing a body of liquid having a specific gravity greater than water for excluding water from the operating means.

3. An apparatus of the class described comprising a housing provided with a horizontal partition forming a liquid tight compartment, a switch throwing device arranged exteriorly of said compartment, operating means connected to said switch throwing device and contained in said compartment, and a seal interposed between said switch throwing device and said operating means embodying a cup depending from said partition and containing a body of mercury for excluding water or other liquid from the said compartment.

4. An apparatus of the class described comprising a housing, switch operating mechanism inclosed in a compartment therein and having a part extending through a wall of said compartment, a switch throwing device connected to said part, and a seal surrounding that part of the switch operating mechanism which extends through the wall of the compartment embodying a cup depending from said wall and containing a liquid of a specific gravity greater than water for excluding water therefrom.

5. A switch throwing mechanism comprising a housing provided with a partition forming a lower compartment therein, a switch throwing device arranged above said partition, switch operating mechanism contained in the compartment beneath said partition and having a shaft extending through the partition and connected to the switch throwing device, and a seal surrounding said shaft embodying a cup depending from said partition and containing a body of mercury forming a liquid-tight joint between it and said partition.

6. An apparatus of the class described comprising a housing provided with a partition forming an inclosed compartment, a switch throwing device arranged at one side of said partition, switch operating mechanism inclosed in said compartment at the opposite side of said partition, and a seal located below the plane of said partition for preventing the entrance of water or moisture to said compartment embodying a liquid having a specific gravity greater than that of water.

7. A switch throwing mechanism comprising a housing provided with a partition forming a lower inclosed compartment, a switch throwing device arranged at the outer side of said partition, switch operating mechanism inclosed in said compartment at the lower side of said partition and having a shaft extending through the latter and connected to the switch throwing device, and means for preventing the entrance of water to said compartment comprising a basin depending from said partition and containing a liquid having a specific gravity greater than that of water, and a flange depending into said liquid.

8. A switch throwing mechanism comprising a housing provided with a partition forming a compartment beneath it, a switch throwing device arranged above said partition, switch operating mechanism inclosed in said compartment beneath said partition and having a rotatable shaft extending through the partition and connected to said switch throwing device, and means for preventing the entrance of water to said compartment comprising an annular basin surrounding said shaft and depending below said partition, and a flange also surrounding the shaft and rotatable therewith, said flange depending into said basin, the latter containing a liquid having a specific gravity greater than that of water.

9. A switch throwing mechanism comprising a housing provided with a partition forming an inclosed compartment beneath it, a switch throwing device arranged above said partition, switch operating mechanism inclosed in said compartment beneath said partition and embodying a shaft which extends through the partition and is connected to said switch throwing device, a basin supported by and depending below said partition and having an inner sleeve forming a journal for said shaft, a body of mercury contained in said basin, and an annular flange surrounding said shaft and depending into the body of mercury to form a water seal between the opposite sides of said partition.

10. In a switch throwing mechanism a means having an inclosed chamber for the operating means, a movable member operated by said last mentioned means, and extending upwardly through a wall of the chamber means, and a liquid seal between said wall and said movable member, said seal located below the upper surface of said wall.

11. A structure comprising a housing having a horizontal partition separating a switch throwing device and operating means and a seal interposed between said switch throwing device and said operating means embodying a cup depending from said partition and containing a body of liquid having a specific gravity greater than water.

12. The combination of a switch throwing mechanism comprising a housing provided with a partition forming an inclosed compartment beneath it, a switch throwing device arranged above the partition, a switch operating mechanism inclosed in said compartment beneath said partition and embodying a shaft which extends through said partition and connected to the switch throwing device and a basin below the partition and a flange carried by the shaft and entering the basin below the partition and a sealing liquid in the basin into which the flange enters.

13. A switch-throwing mechanism comprising a housing provided with a partition forming a liquid-tight lower compartment, a switch-throwing device arranged above said partition and having a crank adapted for connection to a switch point, electromagnetic switch operating mechanism contained in the compartment beneath said partition and having a crank shaft extending through the partition and connected to said crank of the switch-throwing device, and a mercury seal for preventing the passage of water between said partition and the operating part extending therethrough embodying a mercury containing cup on the partition and a flange member between the crank shaft and the cup and immersed in the mercury in said cup.

14. A switch operating mechanism comprising a stationary housing having a water-tight compartment below a partition, solenoids located in said compartment, a shaft extending upwardly through a hole in the partition, said shaft having below the partition a crank which is operatively related to the solenoids, and above the partition a crank which is operatively connected to a switch-point, so that when the shaft is turned by the solenoids the switch-point will be moved, and a mercury seal between the partition and shaft.

This specification signed and witnessed this 18th day of October A. D., 1910.

ROY V. COLLINS.

In the presence of—
EDWIN A. PACKARD,
G. MCGRANN.